Nov. 28, 1950  S. M. CHRISTIAN  2,531,906
FRICTION MEASURING DEVICE
Filed April 5, 1946  2 Sheets-Sheet 1
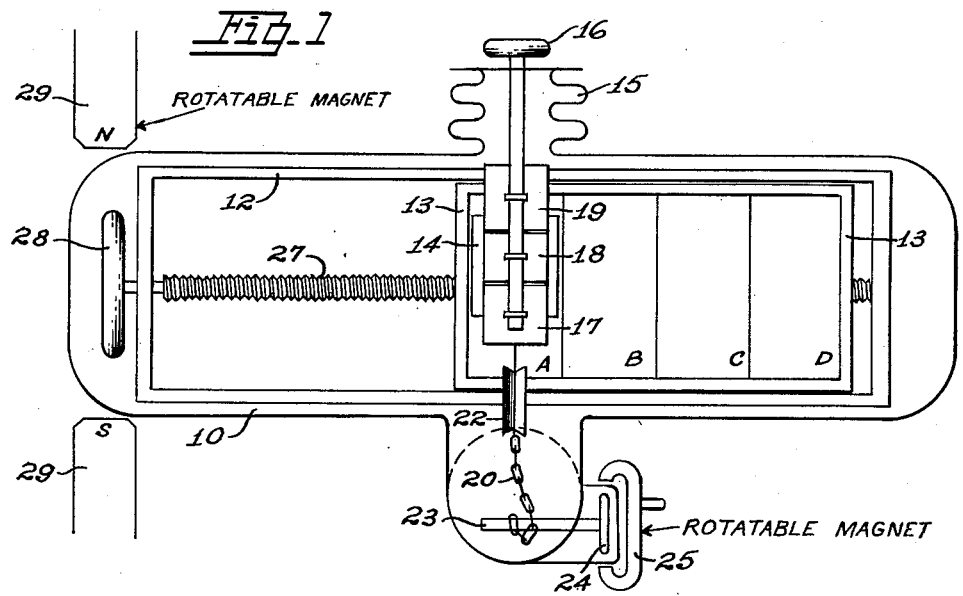
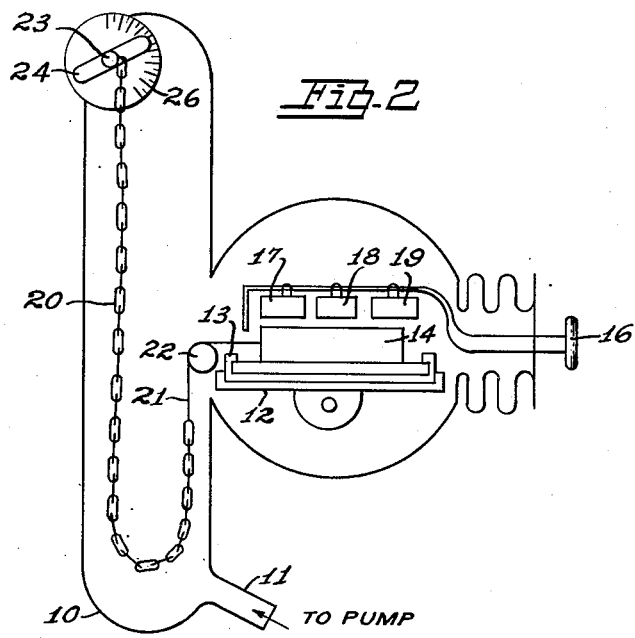
INVENTOR.
S. M. CHRISTIAN
BY
Attorney

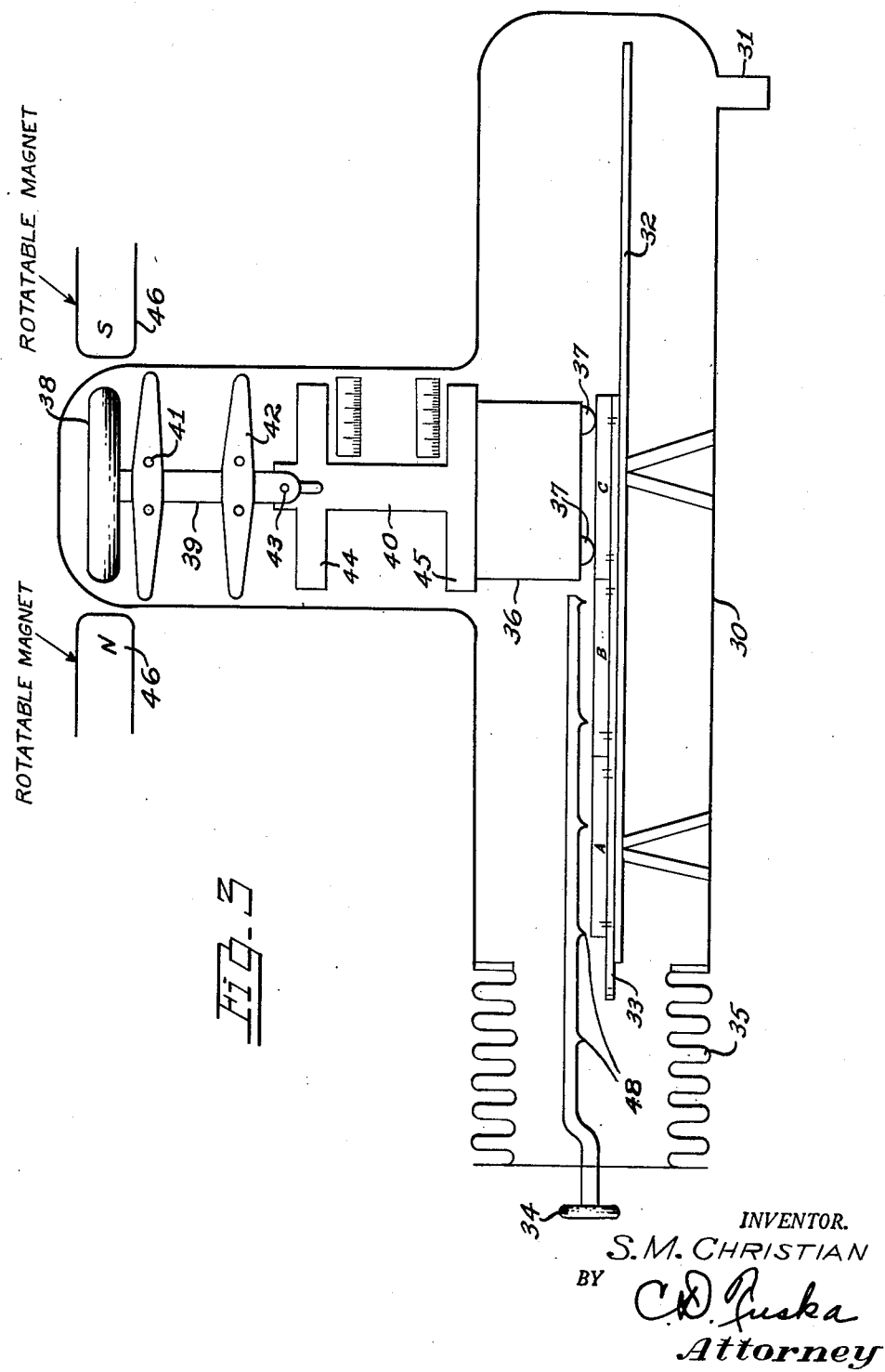

UNITED STATES PATENT OFFICE 2,531,906

FRICTION MEASURING DEVICE

Schuyler M. Christian, Decatur, Ga., assignor to Radio Corporation of America, a corporation of Delaware Application April 5, 1946, Serial No. 659,745

7 Claims. (Cl. 73—9)

This invention relates to measuring devices such as are adapted to measure the coefficient of friction between two metal surfaces, and has for its principal object the provision of an improved measuring device for determining the coefficient of friction between surfaces from which air and other undesired lubricating mediums are excluded.

The term coefficient of static friction is herein designated by the letter $f$, and is related to (1) the pressure N between the surfaces and (2) the force F required to initiate relative movement between the two surfaces so that $$f = \frac{F}{N}$$

If the surfaces move with respect to one another, the coefficient of kinetic friction comes into play and additional factors such as the velocity of relative movement etc. have to be considered. As is well known, the coefficient of kinetic friction is smaller than the coefficient of static friction. The measuring device of the present invention may be readily adapted to measure the coefficient of either type of friction. It is herein described as more particularly designed for measuring the coefficient of static friction.

To this end, there is provided an evacuated enclosure within which are movably supported a plurality of samples which are to have their coefficient of friction determined. Control means outside the evacuated enclosure are provided (1) for applying tractive force to the weight or load which determines the pressure applied to the surface of the sample under test, (2) for adjusting such pressure and (3) for moving the different samples successively into a position to be tested. The device may be of the straight line or torsional type. In either case it includes means inside or outside the enclosure for indicating the magnitude of the tractive force applied to the surface under test. With the values of the load and tractive force known, the coefficient of friction of the sample is readily determined.

Since the device involves bearing or other operating surfaces which move with respect to one another, it is desirable to provide at such surfaces a lubricant designed to eliminate the excessive friction and rapid wear which ordinary metals undergo in the absence of air as a lubricant. To this end, the bearing or sliding surfaces involved in the operation of the device are composed of a powder alloy comprising powdered copper and tungsten in approximately equal proportions. This powder alloy has been found to provide less frictional reaction and wearing when rubbed by a copper or copper-plated contact surface than any other known material. This powder alloy is made preferably by first mixing the two powders and then sintering them together at high pressure for the reason that it is more homogeneous than that produced by other processes.

Important objects of the invention are the provision of an improved device for measuring the coefficient of friction of a surface mounted in an evacuated enclosure, the provision of improved control means for manipulating a test sample within an enclosure, and the provision of an improved lubricant for the bearing and other sliding surfaces of such a device.

The invention will be better understood from the following description considered in connection with the accompanying drawings and its scope is indicated by the appended claims.

Referring to the drawings,

Figures 1 and 2 are top and end views of a friction measuring device of the straight line type, and Figure 3 is an elevation view of a friction measuring device of the torsional type.

The friction measuring device of Figures 1 and 2 includes an enclosure 10 of heat resistant glass or the equivalent which is evacuated through an outlet 11. Mounted within this enclosure is a track 12 upon which rides a carriage 13 for supporting the samples A, B, C, D, etc. to be tested. The samples may be in the form of thin discs or the like to which pressure is applied by a weight or load 14. Through a bellows 15 and a control handle 16 one or more additional weights 17, 18 and 19 may be added to the weight 14. The bellows 15 is made of such length as to permit the member 16 to be moved transversely of the weight 14 so that only the weight 19, the weights 18 and 19 or the weights 17, 18 and 19 may be positioned over the weight 14. With the weights 17, 18 and 19 so positioned, the selected weight or weights may be lowered onto the weight 14 by moving the member 16 to compress the upper side of the bellows 15 and to expand its lower side.

Tractive force is applied to the load 14 through a weight 20 in the form of a chain having (1) one of its ends attached to the load 14 through a belt or cord 21 which rides in the groove of a rotatable idler pulley 22 and (2) the other of its ends fixed to a shaft 23 bearing at one of its ends an armature 24 which is controlled by a rotatable magnet 25 to wind more or less of the chainomatic weight 20 onto the shaft 23. A scale 26 calibrated in terms of the tractive force applied to the load 14 by the weight 20 may be applied to the outer surface of the enclosure 10 as indicated in Figure 2.

Movement of the carriage 13 along the track 12 to bring the samples A, B, etc. into test position is effected by means of a screw 27 to the left hand end of which is fixed an armature 28 rotatable by an external magnet 29. The tested samples may be removed from the enclosure by breaking the seal between the enclosure 10 and the bellows 15.

It is to be assumed that the track 12 and the bearings of the pulley 22 and the armatures 24 and 28 are lubricated by the powder alloy previously discussed.

Figure 3 illustrates a friction measuring device of the type involving the use of a rotary tractive force as distinguished from a straight line tractive force. This modification of the invention includes an enclosure 30 which is evacuated through an outlet 31. Supported within this enclosure is a grooved track 32 on which a carriage 33 is supported for bringing the samples, A. B. etc. successively into test position. Movement of the carriage 33 is effected by means of a control handle 34 and a bellows 35.

It will be noted that the control handle 34 is provided with teeth 48 which are adapted to engage the end of the carriage 33 for moving the test samples successively into the test position.

In this modification of the invention, the load 36 is provided with contact knobs 37 and has torsional tractive force applied to it from an armature 38 through a shaft 39 and a spring 40 of K-Monel metal or the equivalent. It should be be understood (1) that the shaft 39 rotates in ball bearings 41 and 42 and is coupled to the upper end of the spring 40 through a swivel slot 43, (2) that the spring 40 is provided with pointers 44 and 45 which may cooperate with a scale on the outside of the enclosure 30 to indicate the value of the tractive force exerted on the knobs 37, and (3) that the armature 38 is rotated by means of a magnet 46 external to the container 30. As in the case of the previous modification, the track 32 and the bearings 41 and 42 are lubricated by the powder alloy of copper and tungsten.

The measuring device of the present invention thus has the advantage that it affords more load pressure than has heretofore been realized in devices of this character, makes possible the comparison of many samples at one evacuation of the enclosure, and provides means for applying a torsional tractive force which may be utilized for various purposes such as to measure the torsional elasticity of metal discs less than $\frac{1}{16}$ inch thick and of the order of one inch in diameter.

I claim as my invention:

1. The combination of an evacuated enclosure, a track mounted within said enclosure, a carriage movable along said track to bring a plurality of samples successively to a test station along said track, means within said enclosure for loading said samples at said station, means coupled to said loading means inside said enclosure for applying a tractive force between said loading means and a sample at said test station and including a rotatable armature, and means including a rotatable magnet external to said enclosure and magnetically coupled to said armature for controlling the application of said tractive force.

2. The combination of an evacuated enclosure, a track mounted within said enclosure, a carriage movable along said track to bring a plurality of samples successively to a test station along said track, means within said enclosure for loading said samples at said station, means coupled to said loading means inside said enclosure for applying a tractive force between said loading means and a sample at said test station and including a rotatable armature, means including a rotatable magnet external to said enclosure and magnetically coupled to said armature for controlling the application of said tractive force, and means for indicating the value of said tractive force.

3. The combination of an evacuated enclosure, a track mounted within said enclosure, a carriage movable along said track to bring a plurality of samples successively to a test station along said track, means within said enclosure for loading said samples at said station, means coupled to said loading means inside said enclosure for applying a tractive force between said loading means and a sample at said test station and including a rotatable armature, means including a rotatable magnet external to said enclosure and magnetically coupled to said armature for controlling the application of said tractive force, and means external to said enclosure for adjusting the weight of said loading means.

4. The combination of an evacuated enclosure, a track mounted within said enclosure, a carriage movable along said track to bring a plurality of samples successively to a test station along said track, means within said enclosure for loading said samples at said station, weight in the form of a chain for applying a tractive force between said loading means and the sample under test, a shaft rotatably mounted in said enclosure, an armature on said shaft, one end of said chain being connected to said loading means and the other end to said shaft, and a rotatable magnet outside said enclosure and magnetically coupled to said shaft for rotating said armature and said shaft.

5. The combination of an evacuated enclosure, a track mounted within said enclosure, a carriage movable along said track to bring a plurality of samples successively to a test station along said track, means within said enclosure for loading said samples at said station, means including a torsion spring connected to said loading means for applying a tractive force between said loading means and the sample under test, an armature coupled to said torsion spring, and control means outside of said enclosure including a rotatable magnet magnetically coupled to said armature for applying torsional force to said spring.

6. The combination of an evacuated enclosure, a track mounted within said enclosure, a carriage movable along said track to bring a plurality of samples successively to a test station along said track, means within said enclosure for loading said samples at said station, means coupled to said loading means inside said enclosure for applying a tractive force between said loading means and a sample at said test station and including an armature, means including a rotatable magnet external to said enclosure and magnetically coupled to said armature for controlling the application of said tractive force, a screw for moving said carriage, a second armature mounted on said screw, and a second rotatable magnet outside said enclosure and magnetically coupled to said second armature for rotating said second armature and, hence, said screw.

7. The combination of an evacuable enclosure, means within said enclosure for supporting a test sample, means within said enclosure for weight-loading said test sample, means coupled to said loading means inside said enclosure for applying a tractive force between said loading means and said test sample and including a rotatable armature inside said enclosure, and means including a rotatable magnet external to said enclosure and magnetically coupled to said armature for controlling the application of said tractive force.

SCHUYLER M. CHRISTIAN.

REFERENCES CITED

The following references are of record in the file of this patent:

UNITED STATES PATENTS

| Number | Name | Date |
|---|---|---|
| 686,768 | Scott | Nov. 19, 1901 |
| 1,490,603 | Elverson | Apr. 15, 1924 |
| 1,508,825 | Sundstrand | Sept. 16, 1924 |
| 1,635,787 | Hort | July 12, 1927 |
| 1,772,415 | Carpenter | Aug. 5, 1930 |
| 2,091,022 | Stuart | Aug. 24, 1937 |
| 2,127,995 | Grainger | Aug. 22, 1938 |
| 2,225,140 | Walker | Dec. 17, 1940 |
| 2,373,200 | Simmons | Apr. 10, 1945 |
| 2,404,584 | Liska et al. | July 23, 1946 |

FOREIGN PATENTS

| Number | Country | Date |
|---|---|---|
| 257,634 | Great Britain | Apr. 21, 1927 |